US012508229B2

(12) United States Patent
Brown et al.

(10) Patent No.: US 12,508,229 B2
(45) Date of Patent: Dec. 30, 2025

(54) METHOD FOR PREPARING STABLE PEPTIDE FORMULATIONS

(71) Applicant: Amphastar Pharmaceuticals, Inc., Rancho Cucamonga, CA (US)

(72) Inventors: Gregory Nelson Brown, Indianapolis, IN (US); Kurt Gard Van Scoik, Carmel, IN (US)

(73) Assignee: Amphastar Pharmaceuticals, Inc., Rancho Cucamonga, CA (US)

( * ) Notice: Subject to any disclaimer, the term of this patent is extended or adjusted under 35 U.S.C. 154(b) by 984 days.

(21) Appl. No.: 17/606,214

(22) PCT Filed: Apr. 20, 2020

(86) PCT No.: PCT/US2020/028988
§ 371 (c)(1),
(2) Date: Oct. 25, 2021

(87) PCT Pub. No.: WO2020/219391
PCT Pub. Date: Oct. 29, 2020

(65) Prior Publication Data
US 2022/0192988 A1    Jun. 23, 2022

Related U.S. Application Data

(60) Provisional application No. 62/839,246, filed on Apr. 26, 2019.

(51) Int. Cl.
*A61K 9/00* (2006.01)
*A61K 9/19* (2006.01)
*A61K 47/12* (2006.01)
*A61K 47/24* (2006.01)
*A61K 47/40* (2006.01)

(52) U.S. Cl.
CPC .......... *A61K 9/19* (2013.01); *A61K 9/0043* (2013.01); *A61K 47/12* (2013.01); *A61K 47/40* (2013.01); *A61K 47/24* (2013.01)

(58) Field of Classification Search
CPC ........ A61K 9/19; A61K 9/0043; A61K 47/12; A61K 47/40; A61K 47/24; A61K 38/26; A61P 3/08
See application file for complete search history.

(56) References Cited

U.S. PATENT DOCUMENTS

| | | | |
|---|---|---|---|
| 5,179,079 A | 1/1993 | Hansen et al. | |
| 2003/0146156 A1 | 8/2003 | Siwak et al. | |
| 2006/0074025 A1 | 4/2006 | Quay et al. | |
| 2009/0312724 A1* | 12/2009 | Pipkin | A61K 31/724 128/207.18 |
| 2011/0237510 A1 | 9/2011 | Steiner et al. | |
| 2013/0053310 A1 | 2/2013 | Lau | |
| 2018/0236079 A1* | 8/2018 | Chen | A61K 47/26 |
| 2020/0190201 A1* | 6/2020 | Saragovi | A61P 27/16 |

FOREIGN PATENT DOCUMENTS

| | | | | |
|---|---|---|---|---|
| WO | 199216196 A1 | 10/1992 | | |
| WO | WO-2016133863 A1 * | 8/2016 | ................ | A61P 3/00 |
| WO | WO-2017040928 A1 * | 3/2017 | ............. | A61K 38/26 |

OTHER PUBLICATIONS

Fang, W.J., Qi, W., Kinzell, J. et al. Effects of Excipients on the Chemical and Physical Stability of Glucagon during Freeze-Drying and Storage in Dried Formulations. Pharm Res 29, 3278-3291 (2012). https://doi.org/10.1007/s11095-012-0820-7 (Year: 2012).*
Beaven, G. H., Gratzer, W. B., & Davies, H. G. (1969). Formation and structure of gels and fibrils from glucagon. *European journal of biochemistry*, 11(1), 37-42.
Maggio, E. T. (2008). Novel excipients prevent aggregation in manufacturing and formulation of protein and peptide therapeutics. *BioProcess International*, 6(10), 58-65.
Matilainen, L., Maunu, S. L., Pajander, J., Auriola, S., Jääskeläinen, I., Larsen, K. L., . . . & Jarho, P. (2009). The stability and dissolution properties of solid glucagon/γ-cyclodextrin powder. *european journal of pharmaceutical sciences*, 36(4-5), 412-420.
Pedersen, J. S. (2010). The nature of amyloid-like glucagon fibrils. *Journal of diabetes science and technology*. 4(6). 1357-1367.
Pontiroli, A. E., Alberetto, M., & Pozza, G. (1983). Intranasal glucagon raises blood glucose concentrations in healthy volunteers. *British medical journal (Clinical research ed.)*, 287(6390), 462.
Rosenfalck, A. M., Bendtson, I., Jørgensen, S., & Binder, C. (1992). Nasal glucagon in the treatment of hypoglycaemia in type 1 (insulin-dependent) diabetic patients. *Diabetes research and clinical practice*, 17(1), 43-50.
Stenninger, E., & Åman, J. (1993). Intranasal glucagon treatment relieves hypoglycaemia in children with type 1 (insulin-dependent) diabetes mellitus. *Diabetologia*, 36(10), 931-935.
The Protein Man's Blog I A Discussion of Protein Research: Tips for Preventing Protein Aggregation & Loss of Protein Solubility. https://info.ohiosciences.com/blog/tips-lpr-preventing-protein-aggregation-loss-of-protein-solubility. Posted Jan. 29, 2019.
Patent Cooperation Treaty International Search Report pertaining to International Application No. PCT/US2020/028988 International Filing Date: Apr. 20, 2020; Date of Mailing: Jul. 17, 2020.
Patent Cooperation Treaty Written Opinion of the International Searching Authority pertaining to International Application No. PCT/US2020/028988; International Filing Date: Feb. 20, 2019; Date of Mailing: Jul. 17, 2020.

(Continued)

*Primary Examiner* — Isaac Shomer
(74) *Attorney, Agent, or Firm* — IceMiller LLP

(57) ABSTRACT

The present invention provides an improved method for preparing a powder formulation containing a peptide. The present invention further provides an improved method for preparing a powder formulation containing glucagon or a glucagon analog, wherein said powder formulation is suitable for nasal administration.

24 Claims, No Drawings
Specification includes a Sequence Listing.

(56) References Cited

OTHER PUBLICATIONS

Abe, K. et al., "Enhanced nasal delivery of luteinizing hormone releasing hormone agonist buserelin by oleic solubilized and stabilized in hydroxypropyl-beta-cyclodextrin," Chem Pharm Bull (Tokyo), 1995, 43:2232-2237.
Bosch, C. et al., "Physicochemical characterization of glucagon-containing lipid micelles," Biochimica et Biophysica Acta (BBA)-Biomembranes, 1980 603(2), 298-312.
European Patent Office, Summons to Oral Proceedings, Patent No. 3258919, Jun. 28, 2021.
Furubayashi, T. et al., "Evaluation of the contribution of the nasal cavity and gastrointestinal tract to drug absorption following nasal application to rats," Biological and Pharmaceutical Bulletin, 2007 30(3), 608-611.
History of Changes for Study: NCT01994746, Effectiveness and Safety of Intranasal Glucagon for Treatment of Hypoglycemia in Adults, dated Jul. 22, 2020.
Hvidberg, A. et al., "Glucose recovery after intranasal glucagon during hypoglycaemia in man," European Journal of Clinical Pharmacology, 1994, 46(1), 15-17.
International Search Report and Written Opinion of PCT/US2020/028988 (file on Apr. 20, 2020 by Applicant, Eli Lilly and Company); Search completed Jul. 9, 2020, mailed on Jul. 17, 2020 by the European Patent Office; 13 pages.
JAEB Center for Health Research, Datasets & Documents, https://public.jaeb.org/datasets/diabetes, May 13, 2021.
Johnson, P.H. et al., "Advances in nasal drug delivery through tight junction technology," Expert Opinion on Drug Delivery, 2005, 2(2), 281-298.
Liu, D.Z. et al., "Dodecylphosphocholine-mediated enhancement of paracellular permeability and cytotoxicity in Caco-2 cell monolayers," Journal of pharmaceutical sciences, 1999 88(11), 1161-1168.
Merkus, F.W.H.M. et al., "Cyclodextrins in nasal drug delivery," Advanced drug delivery reviews, 1999, 36(1), pp. 41-57.
PDF of google search result for https://s3.amazonaws.com/publicfiles.jaeb.org/t1dx/Protocols/AdultGlucagonProtocol.pdf, dated Jul. 22, 2020.
Pontiroli, A.E., "Intranasal glucagon: a promising approach for treatment of severe hypoglycemia," Journal of Diabetes Science and Technology, 2014, 9(1), 38-43.
Quraishi, M.S. et al., "The nasal delivery of drugs," Clinical Otolaryngology & Allied Sciences, 1997, 22(4), 289-301.
Rickels, M.R. et al., "Intranasal glucagon for treatment of insulin-induced hypoglycemia in adults with type 1 diabetes: a randomized crossover noninferiority study," Diabetes Care 39, No. 2 (2016): 264-270.
Rosenfalck, A. M. et al., "Nasal glucagon in the treatment of hypoglycaemia in type 1 (insulin-dependent) diabetic patients," Diabetes research and clinical practice, 1992, 17(1), 43-50.
Sakr, "Nasal administration of glucagon combined with dimethyl-p-cyclodextrin: comparison of pharmacokinetics and pharmacodynamics of spray and powder formulations," International Journal of Pharmaceutics 1996, 732 (1-2), 189-194.
Seaquist, E. R. et al., "Prospective study evaluating the use of nasal glucagon for the treatment of moderate to severe hypoglycaemia in adults with type 1 diabetes in a real-world setting," Diabetes, Obesity and Metabolism, 2018, 20(5), 1316-1320.
Stenninger, E. et al., "Intranasal glucagon treatment relieves hypoglycaemia in children with type 1 (insulin-dependent) diabetes mellitus," Diabetologia, 1993, 36(10), 931-935.
Vecchio, P.P.G. et al., "Conformation and proteolysis of glucagon and insulin in surfactant and lipid solutions," Biochimica et Biophysica Acta (BBA)-Protein Structure and Molecular Enzymology, 1988, 953, 314-320.
Wider, G., "NMR structures of the micelle-bound polypeptide hormone glucagon," Magnetic Resonance in Chemistry 2003, 41, S56-63.

\* cited by examiner

METHOD FOR PREPARING STABLE PEPTIDE FORMULATIONS

The present invention relates to the field of medicine. More particularly, the present invention provides an improved method for preparing a powder formulation containing a peptide. The present invention further provides an improved method for preparing a powder formulation containing glucagon or a glucagon analog, wherein said powder formulation is suitable for nasal administration.

Peptides are prone to physical instability such as aggregation during and after the manufacturing process. Aggregation is a complex process that originates by several different mechanisms. Aggregation can be typically induced by nucleation of a few peptides or proteins, which form small and soluble aggregates; these then serve as nucleation foci for the subsequent growth of larger insoluble aggregates. The nucleation-growth process can increase with time, temperature, protein concentration, and other parameters. During manufacturing, proteins are purified and concentrated using a variety of means such as ultrafiltration, affinity chromatography, selective absorption chromatography, ion-exchange chromatography, lyophilization, dialysis, and precipitation or "salting out". Such concentration processes can lead to aggregation (Maggio, *BioProcess International* 2008; 6(10): 58-65). Removing or solubilizing these aggregates requires extra process steps which can be costly and can compromise the overall product yield. Effects of aggregation can include loss of material, reduced efficacy, altered pharmacokinetics, reduced stability and product shelf life, and induction of unwanted immunogenicity.

Aggregation has become a major issue for biopharmaceutical manufacturers particularly because the current trend toward high-concentration solutions increases the likelihood of protein-protein interactions, which in turn favors aggregation. (Maggio, *BioProcess International* 2008; 6(10): 58-65). Various approaches to limiting aggregation of a peptide have been studied, including, but not limited to, adjusting: pH, buffer conditions, ionic strength, and/or adding other excipients such as cyclodextrins.

Glucagon is known for its tendency to aggregate in aqueous solutions (Pedersen J S., *J Diabetes Sci Technol.* 2010; 4(6): 1357-1367; Beaven et al., *The European J. Biochem.* 1969; 11(1): 37-42; Matilainen et al., *European J. of Pharmaceutical Sciences* 2009; (36): 412-420), which can cause issues during the manufacture of glucagon powder formulations. Previous methods of preparing glucagon powder formulations suitable for nasal administration are disclosed in WO2016/133863.

There exists a need for alternative methods for preparing peptide powder formulations, in particular glucagon or glucagon analog powder formulations. In particular, there is a need for methods which reduce or eliminate aggregation of the peptide in aqueous solution. By reducing, or, preferably, eliminating aggregation, the final powder formulation will retain a very high percentage of active peptide, which is highly advantageous. Preferably, the method results in an aqueous solution prior to drying which is physically and chemically stable for an extended period of time, for example up to 24 hours. This extended stability makes the process much more amenable to large scale manufacture. There is furthermore a need for a method which results in a final powder formulation having a long shelf-life, preferably up to about 24 months.

Accordingly, the present invention provides an improved and cost effective method of reducing aggregation of a peptide during the manufacture of a powder formulation. This method incorporates a double filtration step. One such peptide used in the present invention is glucagon or a glucagon analog. The powder formulations prepared according to the present method are particularly suitable for nasal administration.

In accordance with one aspect of the invention, a method for preparing a peptide powder formulation is provided. This method comprises the steps of:
 a. forming a first mixture of an acid, a phospholipid surfactant, and a cyclodextrin in an aqueous carrier;
 b. subjecting the first mixture to a first filtration step wherein the filter comprises a membrane with a pore size of about 0.4 µm to about 0.5 µm;
 c. adding a peptide to the first filtration product to form a second mixture, and subjecting the second mixture to a second filtration step wherein the filter comprises a membrane with a pore size of about 0.4 µm to about 0.5 µm; and
 d. drying the second filtration product to form a solid formulation and processing the solid formulation to produce a final powder formulation.

In an embodiment, the peptide is glucagon or a glucagon analog. In particular, it is glucagon.

In an embodiment, the acid is citric acid or acetic acid. In particular, it is acetic acid. More particularly, the acetic acid is at a concentration of 1M.

In an embodiment, the surfactant, the cyclodextrin and the peptide together constitute between about 1.5% and about 3% by weight of the second mixture. In a particular embodiment, they constitute about 2% by weight of the second mixture. In a further embodiment, they constitute about 2.5% by weight of the second mixture.

In an embodiment, the surfactant is dodecylphosphocholine (DPC), didecylphosphatidylcholine (DDPC), lysolauroylphosphatidylcholine (LLPC), dioctanoylphosphatidylcholine (DSPC), or dilauroylphosphatidylglycerol (DLPG). In particular, the surfactant is DPC.

In an embodiment, the cyclodextrin is α-cyclodextrin, β-cyclodextrin, hydroxypropyl β-cyclodextrin, or γ-cyclodextrin. In particular, the cyclodextrin is β-cyclodextrin.

In an embodiment, greater than 98% of the peptide in the final powder formulation is non-aggregated peptide as measured by reversed phase-HPLC. Preferably, greater than 99% of the peptide is non-aggregated peptide. More preferably, 100% of the peptide is non-aggregated peptide.

In accordance with another aspect of the invention, there is provided a method for preparing a peptide powder formulation comprising the steps of:
 a. forming a first mixture of a phospholipid surfactant, and a cyclodextrin in an aqueous carrier;
 b. subjecting the first mixture to a first filtration step wherein the filter comprises a membrane with a pore size of about 0.4 µm to about 0.5 µm;
 c. adding a peptide to the first filtration product to form a second mixture, and subjecting the second mixture to a second filtration step wherein the filter comprises a membrane with a pore size of about 0.4 µm to about 0.5 µm; and
 d. drying the second filtration product to form a solid formulation and processing the solid formulation to produce a final powder formulation.

In an embodiment, the surfactant, the cyclodextrin and the peptide together constitute between about 1.5% and about 3% by weight of the second mixture. In a particular embodiment, they constitute about 2% by weight of the second mixture. In a further embodiment, they constitute about 2.5% by weight of the second mixture.

In an embodiment, the surfactant is DPC, DDPC, LLPC, DSPC, or DLPG. In particular, the surfactant is DPC.

In an embodiment, the cyclodextrin is α-cyclodextrin, β-cyclodextrin, hydroxypropyl β-cyclodextrin, or γ-cyclodextrin. In particular, the cyclodextrin is β-cyclodextrin.

In an embodiment, greater than 98% of the peptide in the final powder formulation is non-aggregated peptide as measured by reversed phase-HPLC. Preferably, greater than 99% of the peptide is non-aggregated peptide. More preferably, 100% of the peptide is non-aggregated peptide.

In accordance with another aspect of the invention there is provided a method for preparing a glucagon powder formulation comprising the steps of:
 a. forming a first mixture of acetic acid, DPC, and β-cyclodextrin in an aqueous carrier;
 b. subjecting the first mixture to a first filtration step wherein the filter comprises a membrane with a pore size of about 0.4 μm to about 0.5 μm;
 c. adding glucagon to the first filtration product to form a second mixture, and subjecting the second mixture to a second filtration step wherein the filter comprises a membrane with a pore size of about 0.4 μm to about 0.5 μm; and
 d. drying the second filtration product to form a solid formulation and processing the solid formulation to produce a final powder formulation.

In an embodiment, glucagon, DPC and β-cyclodextrin together constitute between about 1.5% and about 3% by weight of the second mixture. In a particular embodiment, they constitute about 2% by weight of the second mixture. In a further embodiment, they constitute about 2.5% by weight of the second mixture.

In an embodiment, the acetic acid is at a concentration of 1M.

In an embodiment, greater than 98% of the glucagon in the final powder formulation is non-aggregated glucagon as measured by reversed phase-HPLC. Preferably, greater than 99% of the glucagon is non-aggregated glucagon. More preferably, 100% of the glucagon is non-aggregated glucagon.

The present invention further provides a powder formulation prepared according to a method of the invention.

In specific embodiments, the drying of the second filtration product may be carried out by freeze-drying (lyophilization) or spray-drying.

In a specific embodiment, the filter membrane in both the first and the second filtration step comprises, but is not limited to, polyvinylidene difluoride (PVDF), cellulose acetate, cellulose nitrate, polytetrafluoroethylene (PTFE, Teflon), polyvinyl chloride, polyethersulfone, or other filter materials suitable for use in a cGMP manufacturing environment. In a preferred embodiment, the filter membrane comprises PVDF.

In a specific embodiment, the filter membrane in both the first and the second filtration step is a membrane with a pore size of about 0.45 μm. In a preferred embodiment, the filter membrane is a PVDF membrane with a pore size of 0.45 μm.

In an embodiment, the pH of the solution during the method of the present invention is maintained between 2 and 3.

In an embodiment, the solution phase of the method of the present invention is carried out at a temperature between 15 and 30° C., preferably between 18 and 25° C., more preferably around 20° C.

The methods of the present invention may be used for peptides which have a tendency to aggregate during the manufacture of a powder formulation. In particular, the methods may be used for peptides including, but not limited to, amylin, amylin analogs, recombinant human factor VIII (rfVII), calcitonin gene-related peptide (CGRP), calcitonin, GLP-1 analogs, GLP-1-GLP dual agonists, GIP agonists, recombinant human growth hormone (rhGH), octapeptide CCR5 inhibitor D-Ala-Peptide T-Amide, recombinant human insulin, insulin analogs, PTH 1-31 cyclic peptide analogs, interferon-β, interferons β-1a and β-1b, interleukin-2 (IL-2), erythroporetin (EPO), pramlintide acetate and enzymes such as urokinase.

In particular, the methods of the present invention may be used to prepare a glucagon powder formulation. Glucagon is a highly effective treatment for severe hypoglycemia both outside and within the hospital setting. Glucagon is available as powder formulations that must be mixed with a diluent immediately prior to administration by injection. Liquid formulations of glucagon are also known (Pontiroli et al., *Br Med J (Clin Res Ed)* 1983; 287:462-463). A glucagon powder for nasal administration for the treatment of severe hypoglycemia has been developed and is described in WO2016/133863, this has been recently approved in the US and Europe under the name Baqsimi™.

Glucagon or glucagon analog formulations produced according to the methods of the present invention are particularly suitable for nasal administration. In preferred embodiments, the formulations produced according to the methods of the present invention have one or more of the following:
 A low proportion of small particles that could be capable of reaching the lungs
 Adequate drug content to provide the total dose of drug required to achieve therapeutic effect as a single dose into a single nostril
 Adequate drug content to deliver the total dose in a few tens of milligrams, or the maximum allowed by the delivery device
 Adequate drug content and absorption characteristics to be effective despite the presence of nasal congestion that may be associated with allergies or common cold
 Stability during storage under ambient conditions for an extended period of time, preferably at least 24 months
 Good safety and tolerability profile As used herein, the term "aggregation" refers to the accumulation, clumping, agglomeration, dimerization, polymerization, or formation of seed nuclei, nucleation foci, fibrils, or gels, of small oligomeric precursors such as peptides. Aggregate size ranges from the soluble dimers and other multimers (approximately 5-10 nm in apparent globular diameter) to larger, insoluble species identified as sub-visible and visible particulates (approximately 20-50 μm in apparent globular diameter). From the soluble aggregates group, the larger ones such as high molecular weight species may be capable of eliciting immunogenic responses that could have an adverse clinical outcome.

As used herein, the terms "seed nuclei" or "nucleation foci" refer to the smallest aggregate size from which larger aggregates are formed.

Reversed phase HPLC may be used to determine the amount of non-aggregated peptide in the final powder formulation. Standard conditions known to those skilled in the art can be used, for example those set out in the Examples below.

As used herein, "glucagon" refers to a polypeptide of the sequence (SEQ ID NO: 1)
His-Ser-Gln-Gly-Thr-Phe-Thr-Ser-Asp-Tyr-Ser-Lys-Tyr-Leu-Asp-Ser-Arg-Arg-Ala-Gln-Asp-Phe-Val-Gln-Trp-Leu-Met-Asn-Thr.

The glucagon may be chemically synthesized, produced by recombinant DNA technology or extracted from natural sources. The term "glucagon analog" refers to variants of this sequence that retain the ability to stimulate increase in blood glucose in vivo.

Examples of glucagon analogs in which one amino acid of the natural sequence is replaced with an alanine as well as analogs with multiple substitutions are disclosed in Chabenne et al., *Molecular Metabolism* 2014; 3: 293-300. An exemplary analog in which three amino acids are modified to result in a glucagon analog with enhanced biological activity is [Lys$^{17,18}$, Glu$^{21}$] glucagon. Zealand Pharma has disclosed a multitude of glucagon analogs for example in US Patent Publications 20140080757, 2014001733, 20130316941, 20130157935, 20130157929, 20120178670, 20110293586, 20110286982, 20110286981, and 20100204105. These analogs are reported to have greater binding affinity for the GLP receptor than the glucagon receptor, but nonetheless retain the activity of glucagon. Zealand Pharma has also commenced clinical trials of a glucagon analog for treatment of hypoglycemia designated as ZP4207. US Patent Publication 20130053310 discloses other glucagon analogs useful in treatment of hypoglycemia.

Phospholipid surfactants are ubiquitous components of biological membranes that are part of cells and tissues in the human body, including the nasal mucosa. The most prevalent phospholipid surfactants in cells are phosphatidylcholines and phosphocholines (PC), although phosphatidylglycerols (PG) are significant components of biological membranes. Lysophosphopholipids derived from a diacyl PC or PG by removal one of the acyl groups may also be used.

Exemplary phospolipid surfactants that may be employed in the present invention are dodecylphosphocholine (DPC), didecylphosphatidylcholine (DDPC or 1,2-didecyl-sn-glycero-3-phosphocholine), lysolauroylphosphatidylcholine (LLPC or 1-didecanoyl-sn-glycero-3-phosphocholine), dioctanoylphosphatidylcholine (D8PC or 1,2-dioctanoyl-sn-glycero-3-phosphocholine) and dilauroylphosphatidylglycerol (DLPG or 1,2-dilauroyl-sn-glycero-3-phospho(1'-rac-glycerol)).

Preferred phospholipid surfactants are those that form micelles, rather than bilayers at the concentration used during manufacture of the powder formulation. This includes DPC, DDPC, LLPC, and D8PC, but not DLPG. Most preferred is DPC.

In specific embodiments of the invention, a single type of phospholipid surfactant is used. In other embodiments, the phospholipid surfactant component can be made up from mixtures of phospholipid surfactants, including for example, a combination of any two, three or four of the surfactants identified above.

As used herein, the term "cyclodextrin" refers to a cyclodextrin containing six, seven or eight glucose residues in the ring creating a cone shape, namely:
α (alpha)-cyclodextrin: 6-membered sugar ring molecule
β (beta)-cyclodextrin: 7-membered sugar ring molecule
γ (gamma)-cyclodextrin: 8-membered sugar ring molecule α-CD was used in the powder formulation (HypoGon® Nasal) by Novo Nordisk in clinical trials (Stenniger et al., *Diabetologia* 1993; 36: 931-935; Rosenfalck A M, et al., *Diabetes Res Clin Pract* 1992; 17: 43-50). The aqueous solubility of α-CD is reported to be about 5 wt %.

Two other cyclodextrins, one with aqueous solubility less than that of α-CD (ß-CD, 1.85 wt %) and another with a higher aqueous solubility than α-CD (HP-ß-CD) are also suitable for use in the invention, as is γ-cyclodextrin which is freely soluble in water.

Cyclodextrins in the formulations act as a filler, and also adhere to the nasal mucosal surface and aid in the absorption of glucagon. Upon delivery to the nostril, the major ingredient (90% to 70% by weight) namely, the cyclodextrin helps the powder adhere to the mucosal surface.

The cyclodextrins may be used individually, or as mixtures of any two or more cyclodextrins.

In a particular embodiment, the glucagon powder formulation prepared according to the present method comprises glucagon, DPC and β-cyclodextrin. Preferably, the powder formulation comprises glucagon, DPC and β-cyclodextrin in a weight ratio of 10:10:80 (glucagon:DPC:β-cyclodextrin). Preferably, the glucagon is present in a therapeutic amount that is effective when administered in a single dose in a single nostril. In an embodiment, the dose of glucagon is about 3 mg.

Mixing can be carried out by methods including static and dynamic mixing. Dynamic mixing can be done by use of a blade inserted into the liquid, which is attached to shaft and rotated by a motor. Static mixing can be carried out by flowing the liquid through a tortuous path inside a static mixer. The presence of an air-water interface during mixing under high speed mixing conditions may result in foaming. The high speed mixing may also, in turn, result in destabilization of the protein due to the shear stress. In order to minimize foaming, and preferably eliminate it, low speed mixing conditions are preferred. In the case of dynamic mixing, the speed is determined by the revolutions-per-minute (rpm) of the stirrer. Preferred rpm values are between 50 to 300, more preferably between 50 to 250, even more between 50 and 100.

The second filtration product is dried to remove the solvent and leave a solid product. Drying can be performed by freeze-drying, spray-drying, tray-drying or other techniques. The macroscopic physical characteristics of the product will vary depending on the drying technique, and may be in the form of a flaky solid from freeze drying or a dried solid cake.

Powders with excessive moisture content may be sticky and form clumps resulting in a powder that is difficult to manipulate for filling of an administration device. Importantly, the level of residual water content has a direct impact on the stability. Residual moisture content levels in excess of 5% in the bulk powder result in reduced stability compared to powder with residual water content below 5%. Therefore, in a particular embodiment, powder formulations prepared according to the present invention preferably have residual water content of less than 5%.

In a particular embodiment, the amount of acid in the powder formulations prepared according to the present invention is below 10% w/w, preferably below 6% w/w.

Suitable powders for nasal administration require physical characteristics that permit adequate flowability to allow for filling them into a nasal discharge device. Flowability is determined by various parameters including particle size, shape, density, surface texture, surface area, density, cohesion, adhesion, elasticity, porosity, hygroscopicity, and friability.

Powders with the appropriate particle size and flowability characteristics may be produced by processing the bulk power to remove particles that are too small or too large. Methods of processing the bulk powder to remove the particles that are too small or too large may include milling the bulk powder to break up larger particles and sieving to isolate the particles of the desired particle size range. Various methods of sieving may be performed including throw-action sieving, horizontal sieving, tapping sieving, supersonic sieving and air circular jet sieving. Sieves may be used as single sieves of a fixed nominal aperture or the bulk powder may be processed through a series of sieves of progressively smaller apertures to obtain the desired particle size distribution. Sieves may be woven wire mesh sieves with nominal apertures ranging from 25 to 1000 μm.

EXAMPLES

Example 1—Preparation of Glucagon Powder Formulation—Double Filtration Step

DPC is dissolved into a 1 M acetic acid solution via stirring. Next, β-cyclodextrin is added to the DPC solution, and stirred until dissolved to form a first solution. The first solution is subjected to a first filtration step via a 0.45 μm PVDF filter. The filtration product (excipient solution) is collected into a new, clean tank, and the temperature of the tank is adjusted to 20° C.±2° C. to ensure solubility of the materials in the solution. Once the target temperature in the tank is achieved, glucagon or a glucagon analog is added to the tank whilst stirring the solution. As soon as the glucagon appears to be dissolved, (via visual confirmation) the stirring is immediately terminated. The glucagon solution is then filtered through a second 0.45 μm PVDF filter, and the filter material is collected in a second clean tank. This second filter material (second filtration product) contains 97.5% w/w 1M aqueous acetic acid, 0.25% w/w DPC, 2% w/w β-cyclodextrin, and 0.25% w/w glucagon (total of 2.5% w/w solids by weight). The material is then lyophilized and put through a densification step to produce the final glucagon powder formulation.

Comparative Example—Preparation of Glucagon Powder Formulation—Single Filtration Step DPC is dissolved into a 1 M acetic acid solution (8 litres) via stirring. Glucagon is added whilst stirring the solution. As soon as the glucagon appears to be dissolved, (via visual confirmation) β-cyclodextrin is added whilst stirring. Once all of the added solids appear to have dissolved, the solution is filtered through a 0.45 μm PVDF filter. Use of multiple filters may be necessary if clogging or fouling of a single filter membrane occurs. The filtered material contains 0.3% w/w DPC, 2.4% w/w β-cyclodextrin, and 0.3% w/w Glucagon (total of 3% w/w solids). The filtered material is collected and lyophilized.

Stability of Excipient Solution after First Filtration

The excipient solution (acetic acid, DPC and β-cyclodextrin) is prepared essentially as set out in Example 1 at 2.5% w/w solids concentration. The solution is held at 25° C. for the duration of the study. The data are summarized in Table 1. No significant change in content occurred over a 22-hour period and mass balance was confirmed.

TABLE 1

| Sample Time Hours | DPC Content (% w/w) | β-cyclodextrin Content (% w/w) |
|---|---|---|
| 0 | 0.26 | 2.02 |
| 1 | 0.26 | 2.00 |

TABLE 1-continued

| Sample Time Hours | DPC Content (% w/w) | β-cyclodextrin Content (% w/w) |
|---|---|---|
| 2.7 | 0.26 | 2.05 |
| 3.2 | 0.26 | 1.97 |
| 7.4 | 0.25 | 1.96 |
| 22 | 0.25 | 1.98 |

Stability of the Aqueous Solution Containing Glucagon

Solution Assay

The glucagon solution is prepared essentially as set out in Example 1 (second filtration product). After preparation, the glucagon solution is allowed to sit without stirring. Solution samples are taken at pre-determined times and are passed through a 0.45 μm filter prior to the assay. Any glucagon transformed into aggregates is removed by this filtration step, therefore this assay provides an estimate of the extent of aggregation.

Fluorescence Assay

The basis of the fluorescence method is utilization of the shift in emission wavelength of the single tryptophan residue in the glucagon molecule (Pedersen J S., *J Diabetes Sci Technol.* 2010; 4(6): 1357-1367). As the glucagon molecule changes its conformation from random coil or alpha helix to aggregated forms, the local environment of the tryptophan molecule changes in the form of a blue-shift of the emission spectrum. Thus, by monitoring the change in wavelength of the emission fluorescence signal of glucagon over time with a fiber optically coupled back scattering fluorescence probe, calculating the ratio of emission peaks of unaggregated glucagon to aggregated forms of the molecule can be used as a tool to monitor aggregation on a real-time basis.

The glucagon solution is prepared essentially as set out in Example 1 (second filtration product). A fluorescence probe is used to monitor changes to the emission spectra with time. The solution is not stirred and is monitored at room temperature for 24 hours.

In a small scale experiment (100 mL), no change in glucagon fluorescence ratio was observed in this 24 hour period.

In further experiments, the glucagon solution is prepared essentially as set out in Example 1 (second filtration product) and held at different temperatures. For comparative purposes, this is compared to a glucagon solution which has not been through the second filter step. The results are summarized in Table 2.

TABLE 2

Glucagon Solution Filtration and Holding Temperature Studies

| Experiments | Filtration | Hold Temperature, Time | Stirring | Results |
|---|---|---|---|---|
| A | Yes | 20° C., 24 hours | No | No change in glucagon solution assay |
| B | Yes | 5° C., 24 hours | No | No change in glucagon solution assay |
| C | No | 20° C., 24 hours | No | Loss in glucagon solution assay; Change in fluorescence emission peak ratio |

The results of the study show that when the glucagon solution goes through the second filter step and held without stirring at either 5° C. or 20° C., no glucagon is lost by aggregation from the system. However, when the solution is not filtered it loses approximately 8% of its glucagon content over 24 hours.

Chemical stability of the glucagon solution prepared essentially as set out in Example 1 may also be tested using reversed-phase HPLC essentially as set out below.

In preparations performed essentially as described above with the double filtration in quantities as large as 100 litres (with 2.5% w/w solids), surprisingly, the solution collected after the second filtration step was found to be physically and chemically stable out to 24 hours without any detectable aggregation (as determined by one or more of the methods set out above). Whereas, a glucagon solution material subjected to only one filtration step (Comparative Example—8 litres and 3% w/w solids), showed visible aggregation within about 15 minutes of addition of the glucagon.

HPLC Chemical Stability Analysis of the Nasal Glucagon Powder Formulation

Stability of the nasal glucagon powder formulation prepared according to Example 1 relative to external well-defined reference standards is determined using routine RP-HPLC techniques. Briefly, an HPLC reversed phase column C18, 3.0 mm i.d.×150 mm, 2.6-μm particle size is utilized with a potassium phosphate buffer:acetonitrile mobile phase with a UV detection wavelength of 214 nm. The gradient mobile phase composition is initiated with a 3 minute hold at 54%, 80:20 150 mM potassium phosphate buffer:acetonitrile, and terminated with a 70%, 60:40 potassium phosphate buffer:acetonitrile composition, over the course of 8 minutes.

In experiments performed essentially as described above, as shown in Table 3, representative samples from three different batches of the nasal glucagon powder formulation prepared according to Example 1 (100 L) retained about 100% of glucagon activity within experimental precision.

Potency Bioassay of the Nasal Glucagon Powder Formulation

An embryonic kidney cell line, HEK293, engineered to stably express both a cell-surface receptor for glucagon and a CRE-luciferase reporter gene is utilized to determine the relative potency of the final nasal Glucagon formulation product. In this cell-based assay, the transcription of luciferase from the CRE-promoter is regulated by triggering a response along the endogenous cyclic AMP (cAMP) signaling pathway. Thus, binding of glucagon to the cell surface receptor, induces cAMP production. This leads to the phosphorylation and activation of the cAMP responsive element binding protein (CREB), resulting in expression of luciferase by the CRE-luciferase reporter gene. The luciferase production is determined by adding a luciferin substrate to the reaction mixture and quantifying luciferin oxidation using a luminometer. The luminescence signal is proportional to the amount of luciferase present which is directly proportional to the amount of glucagon used to induce the cells. The relative potency of a test sample is determined by comparing a typical 8-point dose-response curve of the reference standard to that of the sample. The response data is fit to a 4-parameter logistic model to determine the $EC_{50}$ of the reference standard and the $EC_{50}$ of the sample, where the ratio between these $EC_{50}$ values represents the relative potency of the test material.

The HEK293 cells are plated on 96-well cell culture plates in growth media (10% Fetal bovine serum (FBS) in Dulbecco's Modified Eagle's Medium (DMEM) with 1.0 mg/mL Genetecin®, and 125 μg/ml Hygromycin B. Penicillin and Streptomycin may be added at a final concentration of 100 units/mL Penicillin and 100 μg/mL streptomycin) and allowed to attach for between 30 minutes and 2.5 hours at 37° C. The growth media is washed and replaced with assay media consisting of 0.25% FBS in DMEM with 0.5% bovine serum albumin, 1×penicillin/streptomycin, and glucagon in concentrations ranging from 0.00032 ng/mL to 25 ng/mL. Plates are incubated for 4.5 hours at 37° C. 100 μL of SteadyGlo® is added per well and then the wells are continuously agitated for 30 minutes at ambient temperature. The plates are read on a luminometer.

In experiments performed essentially as described above, as shown in Table 3, the percent relative potency of glucagon measured via the cell-based assay was found to be between 94% and 102%, demonstrating that no aggregation was occurring during the preparation of the formulation according to Example 1 (100 L). These results were comparable to the glucagon chemical based assay results using the same reference standard.

Impurity Analysis of the Nasal Glucagon Powder Formulation

Identification, and quantification of potential impurities in the nasal glucagon powder formulation is conducted using routine RP-HPLC techniques. Impurities may arise due to the manufacturing process or chemical decomposition of the materials in the final formulation. The method is based on conditions outlined in the USP41-NF36. This analysis provides an indication of the stability of the glucagon powder formulation.

In experiments performed essentially as described above, as shown in Table 3, the total impurities level at batch release ranges from about 0.4% to about 0.56%. Additionally, the proposed shelf-life specification analysis for the nasal glucagon powder formulation prepared according to Example 1 has a total impurities level of about 20% (a/a) or lower for up to about 24 months. Surprisingly, the nasal glucagon powder formulation has a total impurities level that is significantly less than that recommended for current glucagon emergency kits on the market for which the current USP monograph (USP41-NF36) specifies a limit of not more than 31% (a/a) of total impurities and related compounds be present.

TABLE 3

Nasal Glucagon Powder Formulation Chemical Stability, Bioassay and Impurities Analysis.

| Batch # | Glucagon Chemical Assay (%) | Glucagon Bioassay (% Relative Potency) | Total Impurities (%) |
| --- | --- | --- | --- |
| 1 | 103.1 | 102 | 0.40 |
| 2 | 101.1 | 94 | 0.39 |
| 3 | 102.1 | 97 | 0.56 |

The data above is for batches of powder formulation which have been loaded into a nasal delivery device and then discharged.

Clinical Efficacy of the Nasal Glucagon Powder Formulation

Clinical efficacy of the nasal glucagon powder formulation from a large scale quality controlled manufacturing batch using the two step filtration process of Example 1 was studied in the NCT03339453 clinical trial study (Suico et al., EASD-2008; abstract 150). Briefly, the efficacy and safety of the nasal glucagon powder formulation (NG), was compared to intramuscular glucagon (IMG) in adult patients with Type 1 Diabetes Mellitus during controlled insulin-induced hypoglycemia. The nasal glucagon powder formulation is packaged into a device for delivery to one nostril at a dose of 3.0 mg.

The results as shown in Table 4, demonstrate that 100% of the patients are successfully treated with either NG or the IMG and that the NG activity is comparable to the IMG activity in this study.

TABLE 4

| | Primary Efficacy analysis IGBI (TID) (N = 66)[a] | |
|---|---|---|
| | NG 3 mg | IMG 1 mg |
| Treatment Success - n (%) | 66 (100%) | 66 (100%) |
| Treatment difference (2-sided 95% confidence limit)[b] | 0% (−1.5%, 1.55)[c] | |
| Glucagon criterion met - n (5) | | |
| (i) ≥70 mg/dL (3.9 mmol/L) | 66 (100%) | 66 (100%) |
| (ii) Increase by ≥20 mg/dL (1.1 mmol/L) from nadir | 66 (100%) | 66 (100%) |
| Both (i) and (ii) | 66 (100%) | 66 (100%) |

[a]The Efficacy Analysis Populations consisted of all patients who received both doses of the study drug with eligible glucose concentrations.
[b]Difference calculated as (percentage with success on IMG) − (percentage with success in NG), non-inferiority
[c]2-sided 95% confidence interval (CI) from Wald method with continuity adjustment Sequences (SEQ ID NO: 1)
His-Ser-Gln-Gly-Thr-Phe-Thr-Ser-Asp-Tyr-Ser-Lys-Tyr-Leu-Asp-Ser-Arg-Arg-Ala-Gln-Asp-Phe-Val-Gln-Trp-Leu-Met-Asn-Thr.

We claim:

1. A method for preparing a peptide powder formulation comprising the steps of:
   a. forming a first mixture of an acid, a phospholipid surfactant, and a cyclodextrin in an aqueous carrier;
   b. subjecting the first mixture to a first filtration step to generate a first filtration product wherein the filter comprises a membrane with a pore size of about 0.4 μm to about 0.5 μm;
   c. adding a peptide to the first filtration product to form a second mixture, and subjecting the second mixture to a second filtration step to generate a second filtration product, wherein the filter comprises a membrane with a pore size of about 0.4 μm to about 0.5 μm; and
   d. drying the second filtration product to form a solid formulation and processing the solid formulation to produce a final powder formulation, wherein the final powder formulation is suitable for nasal administration, wherein the second filtration product prior to drying is physically and chemically stable for twenty-four hours at 5° C. or for twenty-four hours at 20° C.

2. The method of claim 1 wherein the peptide is glucagon or a glucagon analog.

3. The method of claim 2 wherein the peptide is glucagon.

4. The method of claim 1 wherein the surfactant, the cyclodextrin and the peptide together constitute between about 1.5% and about 3% by weight of the second mixture.

5. The method of claim 4 wherein the surfactant, the cyclodextrin and the peptide together constitute about 2% by weight of the second mixture.

6. The method of claim 4 wherein the surfactant, the cyclodextrin and the peptide together constitute about 2.5% by weight of the second mixture.

7. The method of claim 1 wherein the membrane in both the first and the second filtration steps comprise a polyvinylidene difluoride (PVDF) membrane.

8. The method of claim 1 wherein the membrane in both the first and the second filtration steps comprises a pore size of about 0.45 μm.

9. The method of claim 1 wherein the acid is citric acid or acetic acid.

10. The method of claim 9 wherein the acid is acetic acid.

11. The method of claim 10 wherein the acetic acid is at a concentration of 1M.

12. The method of claim 1 wherein the surfactant is dodecylphosphocholine, didecylphosphatidylcholine, lysolauroylphosphatidylcholine, dioctanoylphosphatidylcholine, or dilauroylphosphatidylglycerol.

13. The method of claim 12 wherein the surfactant is dodecylphosphocholine.

14. The method of claim 1 wherein the cyclodextrin is α-cyclodextrin, β-cyclodextrin, hydroxypropyl β-cyclodextrin, or γ-cyclodextrin.

15. The method of claim 14 wherein the cyclodextrin is β-cyclodextrin.

16. The method of claim 1, wherein the processing the solid formulation comprises densification.

17. The method of claim 1, wherein the peptide is glucagon, the acid is acetic acid, the phospholipid surfactant is dodecylphosphocholine, and the cyclodextrin is β-cyclodextrin.

18. The method of claim 17 wherein the dodecylphosphocholine, the β-cyclodextrin and the glucagon together constitute about 2.5% by weight of the second mixture.

19. The method of claim 17 wherein the membrane in both the first and the second filtration steps comprises a PVDF membrane.

20. The method of claim 17 wherein the membrane in both the first and the second filtration steps comprises a pore size of about 0.45 μm.

21. The method of claim 17 wherein the acetic acid is at a concentration of 1M.

22. The method of claim 17 wherein greater than 98% of the glucagon in the final powder formulation is non-aggregated glucagon as measured by reversed phase-HPLC.

23. The method of claim 17, wherein the final powder formulation comprises glucagon, dodecylphosphocholine, and β-cyclodextrin in a weight ratio of 10:10:80 (glucagon:dodecylphosphocholine:β-cyclodextrin).

24. The method of claim 17, wherein the processing the solid formulation comprises densification.

* * * * *

SEQUENCE LISTING

<160> NUMBER OF SEQ ID NOS: 1

<210> SEQ ID NO 1
<211> LENGTH: 29
<212> TYPE: PRT
<213> ORGANISM: Homo sapiens

<400> SEQUENCE: 1

His Ser Gln Gly Thr Phe Thr Ser Asp Tyr Ser Lys Tyr Leu Asp Ser
1               5                   10                  15

Arg Arg Ala Gln Asp Phe Val Gln Trp Leu Met Asn Thr
            20                  25